(12) United States Patent
Golla et al.

(10) Patent No.: US 11,086,631 B2
(45) Date of Patent: Aug. 10, 2021

(54) ILLEGAL INSTRUCTION EXCEPTION HANDLING

(71) Applicant: WESTERN DIGITAL TECHNOLOGIES, INC., San Jose, CA (US)

(72) Inventors: Robert T. Golla, Austin, TX (US); Matthew B. Smittle, Allen, TX (US)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 16/661,223

(22) Filed: Oct. 23, 2019

(65) Prior Publication Data

US 2020/0174794 A1 Jun. 4, 2020

Related U.S. Application Data

(60) Provisional application No. 62/773,829, filed on Nov. 30, 2018.

(51) Int. Cl.
*G06F 8/40* (2018.01)
*G06F 9/30* (2018.01)
(Continued)

(52) U.S. Cl.
CPC .......... *G06F 9/3861* (2013.01); *G06F 9/3004* (2013.01); *G06F 9/30145* (2013.01);
(Continued)

(58) Field of Classification Search
CPC .. G06F 9/3861; G06F 9/3004; G06F 9/30145; G06F 9/4812; G06F 9/455; G06F 9/4552; G06F 9/30025; G06F 9/45516; G06F 9/3017; G06F 9/30178; G06F 9/30196; G06F 9/3865; G06F 8/36; G06F 8/37; G06F 8/40; G06F 8/41; G06F 8/42; G06F 8/427; G06F 8/47; G06F 8/48;
(Continued)

(56) References Cited

U.S. PATENT DOCUMENTS

4,694,391 A  9/1987 Guttag et al.
5,790,778 A * 8/1998 Bush ................... G06F 11/3612
                                                          714/34
(Continued)

*Primary Examiner* — Daniel H Pan
(74) *Attorney, Agent, or Firm* — Kowert, Hood, Munyon, Rankin & Goetzel, P.C.

(57) ABSTRACT

Techniques are disclosed relating to the handling of exceptions generated by illegal instructions in a processor. In an embodiment, a processor may be configured to fetch instructions defined according to an instruction set architecture (ISA). The ISA may include a set of uncompressed instructions and a set of compressed instructions. The processor may further be configured to, upon detecting a given one of the set of compressed instructions, cause a copy of the given compressed instruction to be saved and convert the given compressed instruction to a corresponding given uncompressed instruction. The processor may also be configured to detect that the given uncompressed instruction is illegal and was converted from the given compressed instruction, and based at least in part on these, cause an illegal instruction exception to be generated using the copy of the given compressed instruction.

20 Claims, 5 Drawing Sheets

(51) Int. Cl.
*G06F 9/38* (2018.01)
*G06F 9/48* (2006.01)

(52) U.S. Cl.
CPC ............ *G06F 9/4812* (2013.01); *G06F 8/40* (2013.01); *G06F 9/3017* (2013.01)

(58) Field of Classification Search
CPC .... G06F 8/53; G06F 11/0772; G06F 11/3624; G06F 21/125
USPC ........ 712/244, 213, 227; 717/134, 135, 136, 717/137, 138, 139, 140, 141, 143, 145, 717/146, 148; 714/38.1
See application file for complete search history.

(56) References Cited

U.S. PATENT DOCUMENTS

| | | | |
|---|---|---|---|
| 5,802,373 | A | 9/1998 | Yates et al. |
| 7,107,439 | B2 * | 9/2006 | Risucci ............... G06F 9/30174 712/211 |
| 9,135,414 | B1 | 9/2015 | Biffle et al. |
| 2004/0172525 | A1 * | 9/2004 | Rosay .................. G06F 9/3017 712/241 |
| 2005/0081199 | A1 | 4/2005 | Traut |
| 2011/0029761 | A1 * | 2/2011 | Sung ..................... G06F 9/3814 712/228 |
| 2013/0151824 | A1 | 6/2013 | Bugnion |
| 2014/0208087 | A1 | 7/2014 | Hakewill et al. |
| 2016/0124659 | A1 * | 5/2016 | Oportus Valenzuela .................... G06F 12/08 711/165 |
| 2016/0344629 | A1 * | 11/2016 | Gray ....................... H04L 45/60 |

\* cited by examiner

ILLEGAL INSTRUCTION EXCEPTION HANDLING

This application claims the benefit of U.S. Provisional Application No. 62/773,829, filed on Nov. 30, 2018, which is hereby incorporated by reference in its entirety.

BACKGROUND

Technical Field

This disclosure relates generally to microprocessor design, and more particularly, to techniques for handling attempts to execute instructions that are undefined according to a particular instruction set architecture.

Description of the Related Art

Microprocessors (or simply "processors") generally operate by executing programmer-supplied instructions selected from a defined instruction set architecture (ISA). A typical ISA defines the programmer-visible aspects of processor operation, such as the types of instructions that are available to be executed and the manner in which they are encoded.

For a variety of reasons, an instruction may be presented for execution that does not comply with a processor's ISA. For example, it may reference an instruction that does not exist, or it may incorrectly specify operands or parameters for an instruction that does exist. Generally speaking, an instruction that does not comply with an ISA's definitions may be referred to as an "illegal" instruction.

A typical ISA will also define processor behavior when an illegal instruction is encountered. For example, the processor may raise an exception, which causes a software exception handler to perform programmer-defined operations after an illegal instruction is detected. In particular, the ISA may define certain aspects of processor state that are to be made available to the exception handler, such as some or all of the contents of the illegal instruction itself. Implementing support for exception state management may be complicated in certain cases, however, such as cases in which the ISA supports multiple different encodings for certain instructions (e.g., both 16- and 32-bit versions of a particular instruction).

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. An "execution pipeline configured to execute instructions" is intended to cover, for example, an integrated circuit that has circuitry (e.g., arithmetic logic units, load/store unit, etc.) that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a processor having eight processing cores, the terms "first" and "second" processing cores can be used to refer to any two of the eight processing cores. In other words, the "first" and "second" processing cores are not limited to processing cores 0 and 1, for example.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents (such as "one or more" or "at least one") unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Moreover, where flow charts or flow diagrams are used to illustrate methods of operation, it is specifically contemplated that the illustrated operations and their ordering demonstrate only possible implementations and are not intended to limit the scope of the claims. It is noted that alternative implementations that include more or fewer operations, or operations performed in a different order than shown, are possible and contemplated.

DETAILED DESCRIPTION

Figure 1:
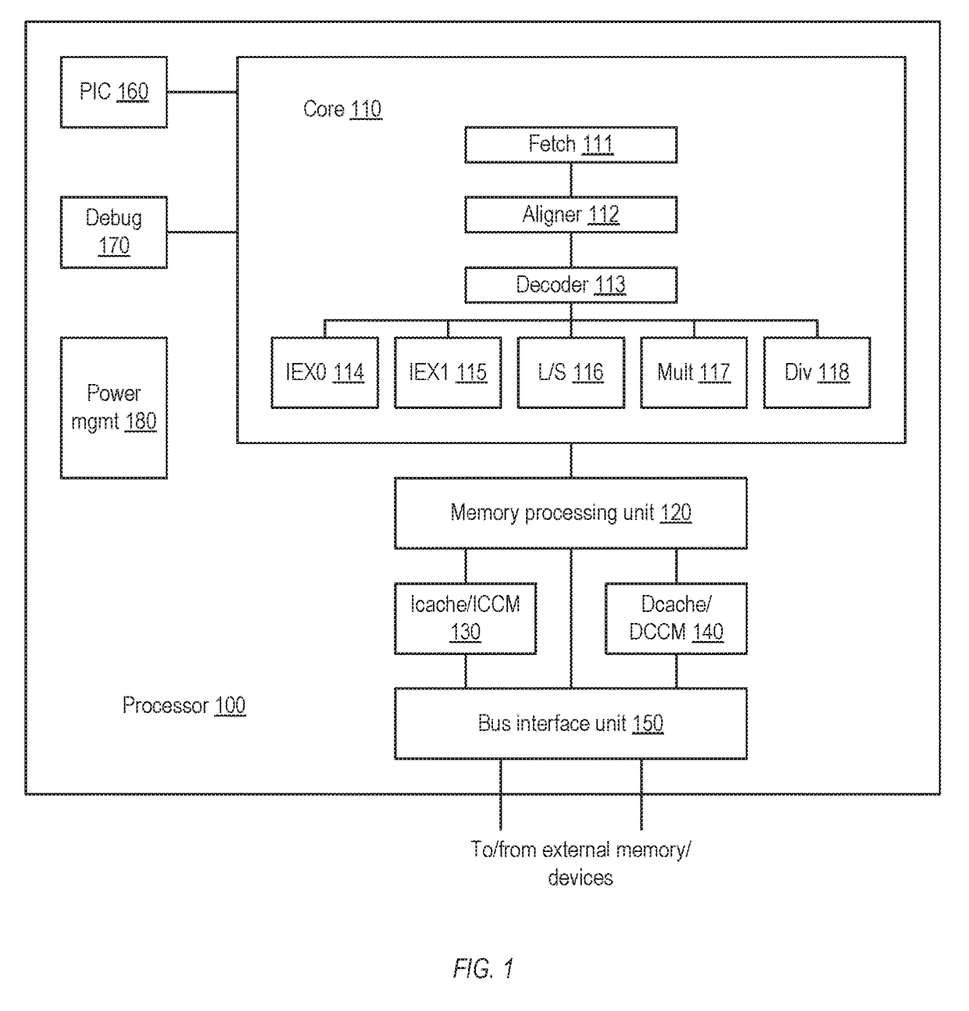
FIG. 1 is a block diagram illustrating one embodiment of a processor having a particular microarchitecture.
Figure 2:
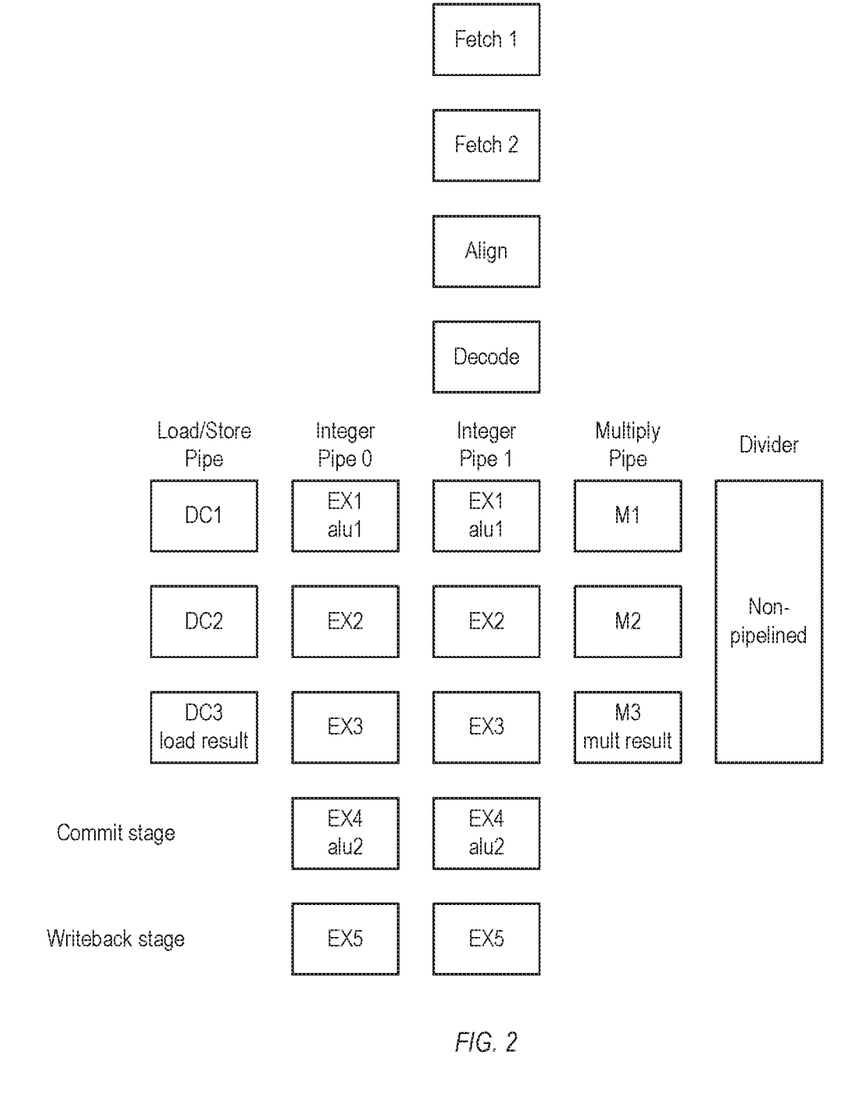
FIG. 2 is a block diagram illustrating one embodiment of execution timing within the processor.
Figure 3:
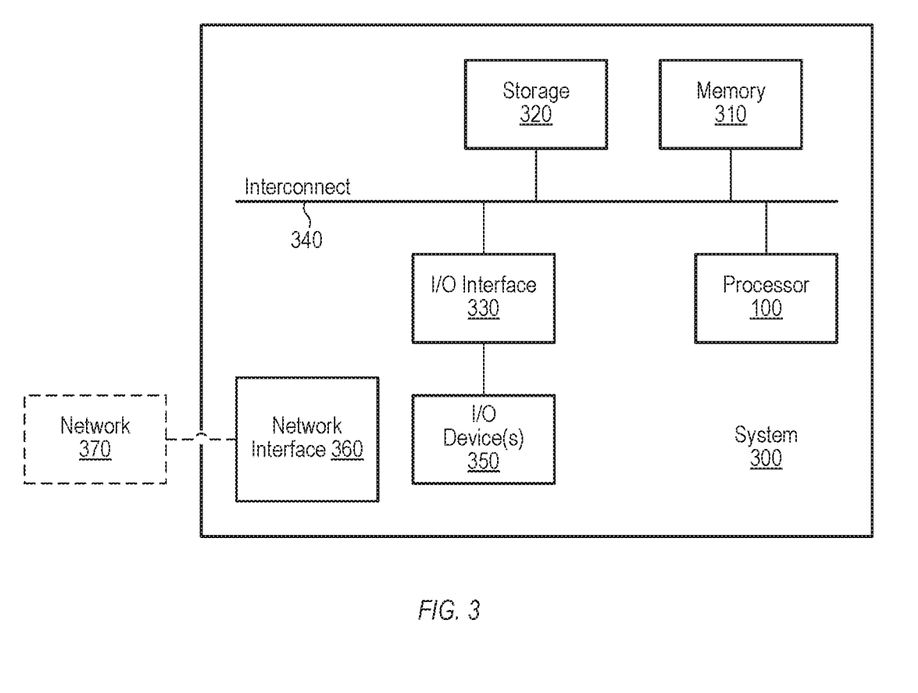
FIG. 3 is a block diagram illustrating one embodiment of a computer system employing the processor.
Figure 4:
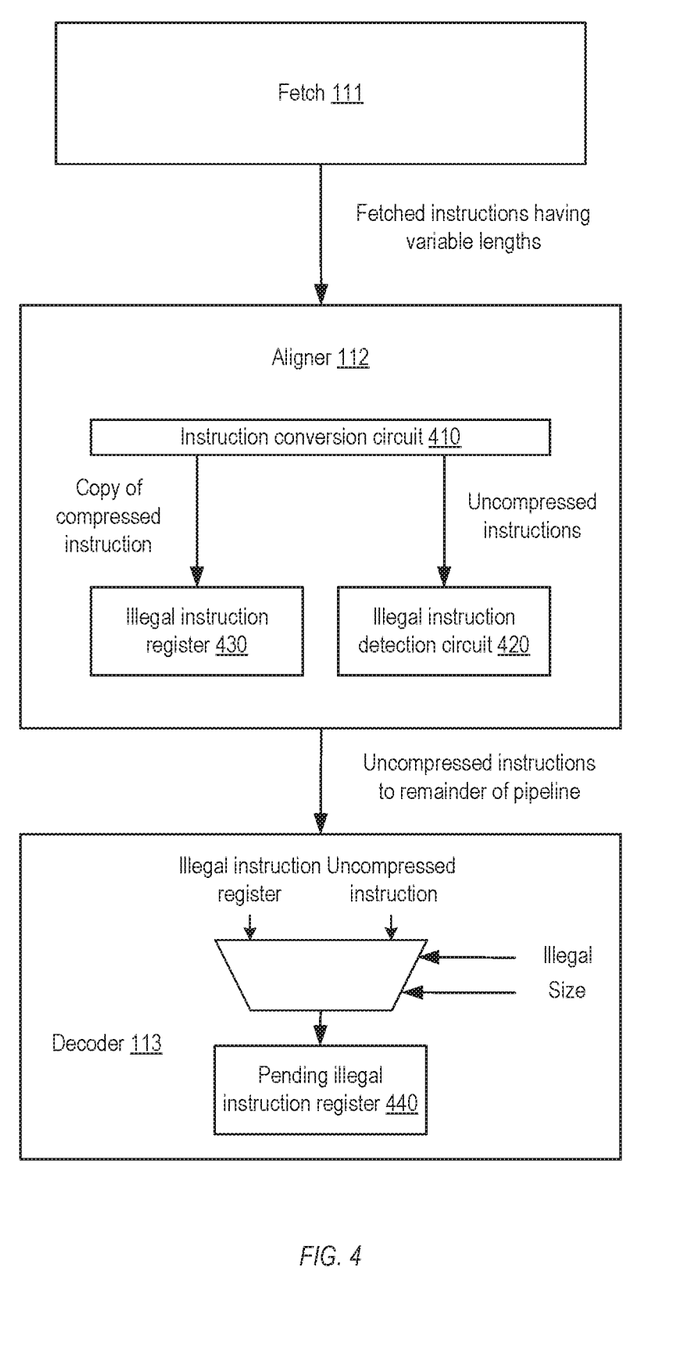
FIG. 4 is a block diagram illustrating an embodiment of a processor configured to implement techniques for handling illegal instructions in the context of varying instruction formats.
Figure 5:
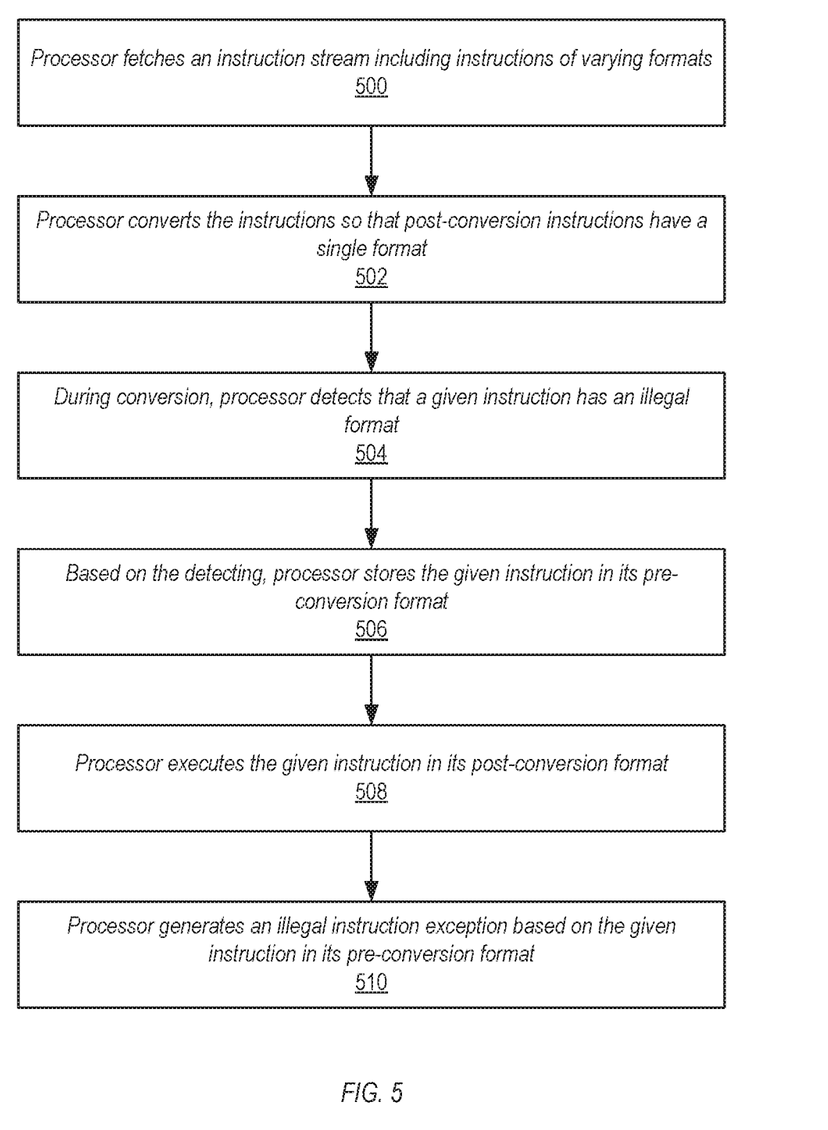
FIG. 5 is a flow diagram illustrating an embodiment of a method of illegal instruction exception handling.

This disclosure initially describes, with reference to FIGS. 1-3, an overview of a processor and its execution pipeline along with an example system configuration in which the processor may be employed. With reference to FIGS. 4-5, it then describes techniques of illegal instruction exception handling with respect to processor embodiments that operate on instruction streams of varying formats or sizes.

Processor Overview

FIG. 1 illustrates an embodiment of a processor 100 organized according to a particular microarchitecture. In some embodiments, processor 100 is configured to implement the RISC-V instruction set architecture (ISA), although other embodiments may implement other suitable ISAs. Preliminarily, it is noted that the microarchitecture shown in FIG. 1 represents merely one possible and non-limiting implementation.

In the illustrated embodiment, processor 100 includes an execution core 110 that includes a number of circuits configured to perform various aspects of instruction execution. In particular, core 110 includes a fetch circuit 111 coupled to an aligner circuit 112, which is in turn coupled to a decoder circuit 113. Decoder circuit 113 is coupled to a number of instruction execution circuits, including first and second integer execution circuits respectively denoted IEX0 114 and IEX1 115, along with load/store circuit 116, multiplier circuit 117, and divider circuit 118. Additionally, processor 100 includes a memory processing unit 120, an instruction cache 130, a data cache 140, a bus interface unit 150, a programmable interrupt controller 160, a debug controller circuit 170, and a power management circuit 180.

Generally speaking, core 110 may be configured to fetch instructions and necessary data, execute instructions, and write results either locally (e.g., to a register file) or into a memory subsystem. In particular, fetch circuit 111 may be configured to initiate this process by retrieving instructions for execution. In various embodiments, fetch circuit 111 may be configured to implement program counter logic and branch prediction circuitry in order to track the flow of program execution and attempt to predict the outcome of conditional branches in order to speculatively fetch branch targets. For example, fetch circuit 111 may implement a "gshare"-style branch predictor in which a table of branch direction predictors is used in combination with a branch target buffer (i.e., a cache of branch target addresses) along with the current program counter and an indicator of global branch history to generate a predicted address from which to fetch instructions. Any suitable branch prediction scheme may be employed, however.

The fetch address generated by fetch circuit 111 may be directed to instruction cache 130. In some embodiments, instruction cache 130 may be implemented as a pipelined, banked, set-associative cache that is accessed by performing an index lookup and a tag comparison to verify that the fetch address is in fact present in the cache. In the event of a cache miss, the fetch address may be sent to bus interface unit 150 to be retrieved from external memory coupled to processor 100. In other embodiments, an instruction closely-coupled memory (ICCM) may be provided in addition to or instead of instruction cache 130. Generally speaking, a CCM is a storage array defined by a directly addressable region of memory addresses; it differs from a cache in that there is no possibility of an access "missing" a CCM and thus having a variable latency depending on its hit/miss status. A CCM may thus provide storage that has relatively low access latency that is also predictably consistent, unlike a cache, which may improve the performance of certain computing workloads such as real-time applications. In some embodiments, an instruction read-only memory (IROM) may be provided in addition to or instead of an ICCM; an IROM may provide similar access timing characteristics as an ICCM but has fixed contents (e.g., determined at the time of manufacture) and cannot be written to.

In some ISAs, instructions may have variable lengths. For example, the RISC-V ISA defines a set of 32-bit instructions as well as 16-bit "compressed" variants of a subset of the 32-bit instructions. Accordingly, in some embodiments, aligner circuit 112 may be configured to identify instruction boundaries within the fetch stream and extract the corresponding instructions for further processing. For example, aligner circuit 112 may be configured to identify RISC-V 16-bit compressed instructions and convert them to their uncompressed 32-bit variants for downstream processing, which may simplify later processing relative to preserving the compressed instructions in their native format.

Decoder circuit 113 may be configured to receive fetched instructions from aligner circuit 112 and decode them in order to determine how they should be further processed within core 110. For example, decoder circuit 113 may examine the operand fields of instructions in order to determine instruction dependencies that may dictate when an instruction is ready to execute; if an instruction requires a result that is not yet available, decoder circuit 113 may delay its execution (and possibly the execution of upstream instructions) until its dependencies are satisfied. In some embodiments, decoder circuit 113 may attempt to group multiple instructions for concurrent execution. To simplify the complexity of this task, some embodiments of decoder circuit 113 may limit the number of instructions issued for concurrent execution. For example, although core 110 includes multiple execution units that could in theory operate concurrently, these execution units may be grouped such that only two instructions are issued per cycle by decoder circuit 113. In other embodiments, however, such limitations may not apply.

In some embodiments, decoder circuit 113 may implement additional operations. For example, decoder circuit 113 may detect synchronization attributes of particular instructions (e.g., instructions that may have special execution timing requirements relative to other instructions in order to ensure correct execution) and appropriately stall or freeze the execution pipeline in order to enforce those attributes. In some instances, decoder circuit 113 may also include a register file configured to implement the architected registers defined by the ISA and/or control/status registers defined by the ISA or the particular processor implementation, although these features may alternatively be implemented elsewhere within core 110.

Once processed by decoder circuit 113, instructions may then be issued to the appropriate execution circuit for execution. In the illustrated embodiment, core 110 includes two integer execution circuits IEX0 114 and IEX1 115, each of which may implement circuitry for executing arithmetic, logical, and shift instructions defined by the ISA. In the illustrated embodiment, IEX0 114 and IEX1 115 are each configured to implement two arithmetic/logic units (ALUs), for a total of four ALUs. As will be discussed below with respect to FIG. 2, the ALUs in each execution circuit may be configured to operate in successive pipeline stages rather than concurrently, in order to facilitate bypassing of results from one execution circuit to another.

In addition to the integer execution circuits, load/store circuit 116 may be configured to execute load and store instructions defined by the ISA. For example, load/store circuit 116 may be configured to perform address generation arithmetic and to present the resulting address to data cache 140 for processing. In some embodiments, like instruction cache 130, data cache 140 may be implemented as a pipelined, banked, set-associative cache that is accessed by performing an index lookup and a tag comparison to verify that the address targeted by the load or store instruction is in fact present in the cache. In the event of a data cache miss, the address may be sent to bus interface unit 150 to be retrieved from external memory coupled to processor 100. In some embodiments, a data closely-coupled memory (DCCM) may be provided in addition to or instead of data cache 140. As noted above, a CCM may effectively operate as a directly addressable on-chip memory with predictable access latency, in contrast to a cache that has a variable, probabilistic access latency. In embodiments that implement only a DCCM without a data cache, accesses within the memory range associated with the DCCM may be routed to the DCCM, whereas accesses outside of that range may ultimately be handled by bus interface unit 150.

Multiplier circuit 117 may be configured to implement integer multiplication instructions defined by the ISA. Divider circuit 118 may be configured to implement integer division instructions defined by the ISA. While multiplier circuit 117 may be pipelined, integer division is typically a complex, long-latency operation. Accordingly, in the illustrated embodiment, divider circuit 118 is implemented as a non-pipelined circuit, and instructions dependent on the results of an integer division instruction will stall until the division is complete. It is noted that while floating-point arithmetic is not explicitly discussed above, embodiments of core 110 may include execution circuits that support such operations.

As shown in FIG. 1, processor 100 includes memory processing unit (MPU) 120 interposed between core 110 and other elements of the memory hierarchy, such as instruction cache 130, data cache 140, and bus interface unit 150. In some embodiments, MPU 120 may include circuitry that supports the load/store pipeline, such as buffers and queues. For example, once load/store circuit 116 computes a memory address (or, in some cases, once fetch circuit 111 computes a fetch address), in some embodiments a memory access may be enqueued within MPU 120 while awaiting downstream processing. Similarly, MPU 120 may implement a store buffer that is configured to hold post-commit store instructions (i.e., store instructions that have been completed and are intended to modify programmer-visible state) until they can be written to the memory subsystem via bus interface unit 150. It is noted that in other embodiments, some or all of the features of MPU 120 may be implemented elsewhere within processor 100, such as within load/store circuit 116. Additionally, in some embodiments, MPU 120 may implement protection features that, for example, enforce a privilege model or otherwise restrict access to defined addresses or regions of the memory address space, which may improve the stability and security of code execution. In embodiments of processor 100 that support virtual memory addressing, MPU 120 may additionally include circuitry related to address translation such as translation lookaside buffers (TLBs). As noted above, however, translation circuitry may be located elsewhere within processor 100 depending on design considerations (e.g., whether caches/CCMs are virtually or physically addressed).

Bus interface unit (BIU) 150 may be configured to interface processor 100 with other devices, such as memory, input/output devices, or other peripherals. External devices may either be on-chip (e.g., on the same silicon as processor 100, as in a system-on-a-chip (SoC) implementation) or off-chip. In some embodiments, BIU 150 may interface with external devices according to a version of the Advanced Microcontroller Bus Architecture (AMBA) standard, such as the Advanced High-performance Bus (AHB) bus protocol introduced in the AMBA 2 specification. Any other suitable bus architecture or protocol may be employed, however. BIU 150 may include circuits such as load and store queues configured to store pending load and store instructions as well as state machines or other circuits configured to implement the appropriate bus transaction logic.

In some embodiments of processor 100 that include an ICCM and/or a DCCM, these memory structures may be accessible via direct memory access (DMA) by off-processor devices in addition to being accessed by instructions executing in core 110. In such embodiments, processor 100 may include arbitration circuitry configured to arbitrate competing ICCM/DCCM accesses originating from processor 100 and DMA. For example, processor accesses may generally take priority over DMA accesses, although the arbitration circuitry may employ fairness and/or performance factors to ensure that DMA accesses are eventually serviced. In some embodiments, an ICCM/DCCM may be implemented in a banked manner with arbitration being performed on a per-bank basis, so that different banks may concurrently service accesses from processor 100, DMA, or a combination of these.

Programmable interrupt controller (PIC) 160 may be configured to facilitate the processing of interrupts originating externally to processor 100, such as asynchronous interrupts from peripherals that need to perform input/output. In various embodiments, PIC may implement circuitry configured to prioritize and mask interrupts according to user-programmable specifications, to support vectoring of interrupts to corresponding dedicated interrupt handler locations in memory, to support nesting and chaining of concurrent or successive interrupts, or any other suitable interrupt-related processing. In some embodiments, PIC 160 may process exceptions or faults arising from instruction execution within core 110 in addition to external interrupts.

Debug controller circuit 170 may be configured to implement a variety of debug-related features. For example, the RISC-V ISA defines an extensive debugging interface that can enable software to inspect and control the operation of processor 100 at a fine level of granularity. To support these features, debug controller circuit 170 may implement features such as breakpoints, timers, or other event-related triggers that, for example, facilitate pausing of instruction execution when defined events are detected, so that a user can inspect the state of processor 100 and associated memory at that time. Such features, along with features such as single-step execution, may facilitate the debugging of software executing on processor 100.

Some features of debug controller circuit 170 may also be used to perform hardware debug/test, for example as part of a silicon development or manufacturing test scenario. For example, debug controller circuit 170 may implement a command interface that may be accessible either via software or via hardware test features such as JTAG ports. The command interface may enable a user to read and/or write state elements within processor 100, such as register files, memory arrays, and the like. Thus, debug controller circuit 170 may facilitate the injection of test code into processor 100 in order to verify or debug a partially-operative hardware system.

Lastly, power management circuit 180 may be configured to coordinate power management features across processor 100. For example, power management circuit 180 may be configured to implement support for architecturally-defined power management states and to correctly transition processor 100 across those states, e.g., by controlling the sequence in which circuits of processor 100 are energized or depowered. Power management circuit 180 may also be configured to implement other power management features that are not necessarily architecturally defined, such as detecting and depowering idle circuits in order to decrease power consumption.

FIG. 2 is a pipeline diagram illustrating the execution timing of an embodiment of processor 100. As shown, instruction execution proceeds from top to bottom in a nine-stage pipeline, and each row of FIG. 2 represents one execution cycle. In this implementation, the operation of fetch circuit 111 is split across two cycles (denoted Fetch 1 and Fetch 2), during which instruction memory access occurs (e.g., to cache, ICCM, or IROM) and fetch buffers containing unaligned fetch results are populated. A stall may occur at the Fetch 1 stage in the event of a cache miss or line fill condition.

Operation of aligner circuit 112 occurs in the Align stage. A stall may occur here in certain cases of misalignment. For example, if multiple fetch buffers need to be scanned to identify instructions to be decoded, a stall may be necessary.

Decoder circuit 113 operates during the Decode stage. In one embodiment, decoder circuit 113 attempts to identify up to two instructions that can be issued together for execution, subject to dependencies, although other embodiments may attempt to identify greater degrees of concurrency. Stalls may occur at the Decode stage based on dependencies, instruction synchronization requirements, or other factors.

Following the Decode stage, processing depends upon which execution circuit an instruction is routed to. Instructions destined for integer execution circuits IEX0 114 or IEX1 115 enter the EX1 stage of Integer Pipe 0 or Integer Pipe 1, respectively. As discussed above, in one embodiment, IEX0 114 and IEX1 115 may each include 2 ALUs, one of which executes at the EX1 stage, and the other of which executes at the EX4 stage. As can be seen relative to the other execution circuit pipelines, including an ALU at the EX4 stage may enable forwarding of results from other execution circuits, and may prevent some instances of dependency-related stalls.

As shown, instruction commit decisions occur during the EX4 or Commit stage. For example, by the end of EX4, all speculative conditions that would prevent an instruction result from properly being committed to architectural state (such as branch mispredictions, exceptions, interrupts, or similar conditions) should be resolved. Either invalid state will be flushed or the instruction currently at EX4 will be permitted to modify architectural state at the EX5 or Writeback stage.

Load/store instructions enter the DC1 stage of the Load/Store Pipe and proceed to perform address generation and cache/DCCM lookup. In the illustrated case, loads and stores are effectively complete at the DC3 stage and can be forwarded, although they still need to proceed to the Commit and Writeback stages before they can be allowed to persistently modify architectural state.

Multiply instructions enter the M1 stage of the Multiply Pipe. As shown, the Multiply Pipe has similar timing to the Load/Store Pipe, with results available for forwarding at the M3 stage. Like load/store instructions, however, multiply instructions still proceed to the Commit and Writeback stages prior to persistently modifying architectural state.

In some embodiments, the Load/Store Pipe and Integer Pipe 0 may be treated as a unit for instruction issue purposes. That is, during a given cycle, decoder circuit 113 may issue an instruction to one of these pipelines, but not the other. Integer Pipe 1 and the Multiply Pipe may be treated as a similar unit, such that decoder circuit 113 may issue up to two instructions per cycle for execution. In other embodiments, more aggressive issue scheduling may be implemented.

As noted above, divide instructions are issued from decoder circuit 113 to divider circuit 118, although in the illustrated embodiment, divide operations are long-latency, unpipelined operations. For completeness, the divider path is shown in FIG. 2 as an issue path alongside the remaining execution pipelines.

Example Computing System

Processor 100 may be included within a variety of system configurations, one example of which is shown in FIG. 3. In various embodiments, system 300 may correspond to a general-purpose computer system, such as a desktop or portable computer, a mobile phone, or the like. System 300 may also correspond to any type of embedded system that may employ one or more instances of processor 100 as a dedicated controller. For example, system 300 may correspond to any type of computer peripheral device such as a mass storage device or storage array, printer, or the like, as well as control systems for automobiles, aviation, manufacturing, and other suitable applications.

As shown, system 300 includes processor 100, memory 310, storage 320, and an input/output (I/O) device interface 330 coupled via an interconnect 340. One or more I/O devices 350 are coupled via I/O interface 330. System 300 also includes a network interface 360 that may be configured to couple system 300 to a network 370 for communications with, e.g., other systems. (In various embodiments, network interface 360 may be coupled to interconnect 340 directly, via I/O interface 330, or according to a different configuration.) It is noted that some or all of the components of system 300 may be fabricated as a system-on-a-chip, although discrete combinations of components may also be employed.

Processor 100 corresponds to one or more instances of the processor configuration described above with respect to FIGS. 1-2, or a suitable variant thereof. Memory 310 may include random access memory (RAM) of any suitable configuration, such as working memory configured to store data and instructions usable by processor 100. Storage 320 may include mass storage devices such as magnetic, optical, or nonvolatile/flash memory storage, or a combination of these. In some embodiments, either of memory 310 or storage 320 may be omitted or integrated into the other as a single memory subsystem from the perspective of processor 100.

I/O interface 330 may be configured to interface between interconnect 340 and one or more other types of buses or interfaces. For example, interconnect 340 may correspond to the AHB interface discussed above (or another suitable type of high-bandwidth interconnect), and I/O interface 330 may be configured as a bridge device that enables coupling of different types of I/O devices to interconnect 340. I/O interface 330 may implement one or more interface protocols such as Universal Serial Bus, Firewire, or other suitable standards. I/O device(s) 350 may include any suitable type of storage, network interface, user interface, graphics processing, or other type of device. Network 370, if present, may be any suitable type of wired or wireless communications network, such as an Internet Protocol (IP) addressed local or wide-area network, a telecommunications network, or the like. Network interface 360, if present, may be configured to implement any suitable network interface protocol needed for communication with network 370.

Illegal Instruction Handling

In some embodiments, processor 100 may implement an ISA that includes multiple different encodings for various instructions. For example, the RISC-V ISA defines a set of uncompressed instructions that may be, e.g., 32 bits in length, along with a set of compressed instructions that may be, e.g., 16 bits in length. In some embodiments, there may exist a one-to-one correspondence between each compressed instruction and a corresponding uncompressed instruction, although there may be uncompressed instructions that do not have compressed variants. Compressed instructions are, by definition, more compact than uncompressed instructions, although their smaller size means that compressed instructions cannot support as many parameters or variants as their uncompressed counterparts. Supporting compressed and uncompressed versions of the same instruction in an ISA may enable a reduction in size of an executable instruction stream, via the use of compressed versions when possible, while still providing access to the richer feature set uncompressed versions may provide.

As just noted, supporting compressed instructions in addition to uncompressed instructions may improve code density and/or fetch bandwidth. To the extent that a given program is able to use compressed instructions, it may require less storage, which can reduce system cost particularly in embedded systems. To simplify the design of processor 100, however, it may be desirable to convert compressed instructions to their corresponding uncompressed format relatively early in the processing pipeline, in order to avoid having to support varying-length instructions having different encoding formats throughout the processor. Thus, for example, shortly after instructions are fetched, processor 100 may perform conversion so that downstream from the fetch stage, instructions are uniformly represented in a consistent (e.g., uncompressed) format.

Such conversion early in the execution pipeline may have consequences with respect to conforming operation of processor 100 to architecturally-defined expectations, however. For example, processor 100 may attempt to execute an instruction that is illegal under the ISA—for example, the instruction may not be defined in the ISA or may be incorrectly formatted or encoded with respect to the ISA. In this event, the ISA may dictate that an exception should be generated to handle the illegal instruction. For example, information about the illegal instruction such as its contents and address may be supplied to an exception handling routine so that appropriate recovery or debugging may occur.

The ISA may specify, however, that if a compressed instruction is determined to be illegal, all or part of the compressed instruction should be made available for exception handling in its original format. If compressed instructions are converted to uncompressed instructions before illegal instruction detection is performed, however, it may be difficult to satisfy this requirement. For example, once an instruction is converted from compressed to uncompressed format within the pipeline, it may be difficult to reconstruct to reconstruct the original compressed form of the instruction as expected by the exception handler.

Accordingly, in some embodiments processor 100 may be configured to preserve a copy of a compressed instruction after its conversion to uncompressed format. In some implementations, the copy of the compressed instruction may be passed down the pipeline from the point at which the compressed instruction is converted to uncompressed format until the time an illegal instruction exception is generated, if necessary. In other implementations, the copy of the compressed instruction may be generated conditionally depending on detecting that the compressed instruction is illegal. In this case, only the first illegal compressed instruction that is detected may be stored, and subsequent illegal compressed instructions may be prevented from overwriting the first one that is detected. (In typical architectures, only the first faulting instruction generates an exception that results in flushing the pipeline of instructions following the faulting instruction; accordingly, there may be no need to retain state associated with subsequent faulting instructions.)

FIG. 4 illustrates an embodiment of processor 100 that is configured to convert compressed to uncompressed instructions while preserving original information about the compressed instruction in the event of an illegal instruction exception. In the illustrated embodiment, fetch circuit 111, aligner circuit 112, and decoder circuit 113 of core 110 are shown in greater detail; other elements of processor 100 are omitted in FIG. 4 for clarity.

As noted above with respect to FIG. 1, fetch circuit 111 may be configured to fetch instructions that are defined according to a particular ISA. In particular, the ISA may include instructions of varying lengths. For example, the varying-length instructions may include the compressed instructions and uncompressed instructions defined in the RISC-V architecture as noted above, although other examples are possible and contemplated.

It is noted that fetch circuit 111 may include a variety of sub-circuits configured to perform various tasks. In some embodiments, fetch circuit 111 includes one or more program counters configured to store the memory address associated with an instruction or a block of instructions being fetched, and to appropriately increment the program counter(s) in order to reflect the orderly flow of program execution. In some embodiments, fetch circuit 111 may include branch prediction circuitry configured to predict the outcome of conditional branch instructions and to steer instruction fetching accordingly. For example, such branch prediction circuitry may include static branch predictors based on branch direction, counter-based predictors configured to predict branch outcomes based on collected statistics regarding branch behavior, local and/or global predictors, branch history or target buffers and/or caches, or any suitable combination of these and/or other structures. In some embodiments, fetch circuit 111 may include any of a number of other circuits, such as buffer and/or state machine circuitry configured to manage the interaction between fetch circuit 111 and a memory or cache from which instructions are fetched. For clarity of presentation, however, these various elements are not shown in FIG. 4.

As shown, fetch circuit 111 passes to aligner circuit 112 a fetched instruction stream that includes instructions having variable length. The illustrated embodiment of aligner circuit 112 includes an instruction conversion circuit 410, an illegal instruction detection circuit 420, and an illegal instruction register 430, although these elements may be implemented elsewhere within core 110 (e.g., within fetch circuit 111) in other embodiments. Aligner circuit 112 may also include a variety of other circuits not shown in FIG. 4. For example, aligner circuit 112 may include combinatorial logic, shifters, multiplexers, or other circuitry configured to examine a stream of data fetched by fetch circuit 111 to determine instruction boundaries within the stream (e.g., by partially decoding bytes within the stream).

Instruction conversion circuit 410 includes circuitry, such as a lookup table or appropriate combinational logic, that may be configured to detect a given occurrence of a compressed instruction in the fetched instruction stream and to convert the given compressed instruction into a corresponding uncompressed instruction for downstream processing within core 110. For example, when implementing the RISC-V ISA, instruction conversion circuit 410 may be configured to detect occurrences of compressed 16-bit instructions (e.g., by examining potential opcode bits to see if they identify a particular compressed instruction) and map them to corresponding 32-bit instructions (e.g., by retrieving the corresponding instruction from a table or simply generating the corresponding instruction using combinatorial logic preconfigured to output the appropriate mapping). In some embodiments, instruction conversion circuit 410 may be configured to generate one or more state signals associated with the uncompressed instruction, such as a status bit or field, that indicates that the uncompressed instruction was derived from conversion of a compressed instruction. Such state signals may accompany the uncompressed instruction for downstream processing.

Instruction conversion circuit 410 may also be configured to cause a copy of the given compressed instruction to be saved, for example in a register, buffer, or other storage element. In some embodiments, this copy may be saved unconditionally, although as described below, in other embodiments, it may be saved conditionally.

Illegal instruction detection circuit 420 includes circuitry configured to detect that the uncompressed instruction is illegal and that it was converted from the given compressed instruction. For example, illegal instruction detection circuit 420 may be configured to examine state signals associated with the uncompressed instruction (e.g., the bit, field, or other token generated by instruction conversion circuit 410 as mentioned above) that indicates whether or not the uncompressed instruction was converted from a compressed instruction. Illegal instruction detection circuit 420 may also be configured to examine an opcode field and/or other fields of the uncompressed instruction to determine whether any portion of the uncompressed instruction is undefined, incorrectly formatted, or otherwise encoded in a manner that is not valid for the implemented ISA. Such detection may be implemented using combinatorial logic preconfigured to detect valid data patterns defined by the ISA, using lookup tables, or any other suitable technique. (While illegal instruction detection is shown here as occurring subsequent to instruction conversion, in other embodiments these could be implemented in the reverse order.)

In some embodiments, based at least in part on detecting that the uncompressed instruction is illegal and was converted from the given compressed instruction, illegal instruction detection circuit 420 may be configured to cause a copy of the given compressed instruction to be saved in illegal instruction register 430. For example, illegal instruction detection circuit may coordinate with instruction conversion circuit 410 to cause the copy to be saved conditionally, or may internally buffer the copy from instruction conversion circuit 410 and cause it to be saved without further coordination with instruction conversion circuit 410. In some embodiments, the entirety of the given compressed instruction may be saved in illegal instruction register 430, while in other embodiments, only a portion of the given compressed instruction, such as an opcode field, may be saved.

Additionally, based at least in part on detecting that the uncompressed instruction is illegal and was converted from the given compressed instruction, illegal instruction detection circuit 420 may be configured to cause an illegal instruction exception to be generated using the copy of the given compressed instruction. In some embodiments, the actual generation of the illegal instruction exception may be delayed until the uncompressed instruction reaches an appropriate stage of the execution pipeline such as the commit stage, because if the uncompressed instruction is flushed prior to being committed (e.g., owing to a branch prediction, another exception or interrupt, or a similar condition), any exceptions associated with the uncompressed instruction would typically be suppressed. Accordingly, causing the illegal instruction exception to be generated may include asserting a signal indicative of an exception condition, which may include setting a state bit or field associated with the uncompressed instruction that indicates that an exception is pending. The exception condition state signal may accompany the uncompressed instruction through the execution pipeline. If the uncompressed instruction reaches a commit stage without being flushed—i.e., it is determined that the uncompressed instruction should modify architecturally-visible state—then the exception condition may cause the illegal instruction exception to be generated.

It is possible that uncompressed instructions that were not converted from compressed instructions may also be illegal. Accordingly, illegal instruction detection circuit 420 may also be configured to detect that an uncompressed instruction is illegal and was not converted from a compressed instruction, and based on these, cause an illegal instruction exception to be generated using the uncompressed instruction. In some embodiments, nothing may be stored in illegal instruction register 430 for this case, because there is no original, pre-conversion state of the uncompressed instruction to be retained. As discussed below, however, in other embodiments illegal instruction register 430 may contain either the compressed or uncompressed instruction, as appropriate, based on whether the faulting uncompressed instruction was originally compressed.

As noted above, only the first faulting instruction in the instruction stream may result in an exception being raised. Accordingly, in some embodiments, illegal instruction detection circuit 420 may implement a lockout mechanism, such as a status bit or field associated with illegal instruction register 430. The lockout mechanism may be asserted when illegal instruction register 430 is initially written, and once asserted, may prevent illegal instruction register 430 from being overwritten by a subsequent illegal instruction. The lockout mechanism may be deasserted or cleared by a pipeline flush, which may include a flush caused by an illegal instruction exception arising from the first value written into illegal instruction register 430, or a flush caused by an older instruction in the pipeline or another event (such as a mispredicted branch, instruction fault, interrupt, etc.).

As shown in FIG. 4, aligner circuit 112 may be configured to send uncompressed instructions (either natively fetched as uncompressed, or resulting from conversion by instruction conversion circuit 410) to the remainder of the pipeline, including decoder circuit 113. In the illustrated embodiment, decoder circuit 113 is configured to receive an uncompressed instruction along with contents of illegal instruction register 430.

Based at least in part on detection that the uncompressed instruction is illegal and an original size of the uncompressed instruction, decoder circuit 113 may be further configured to select one of the uncompressed instruction or the contents of illegal instruction register 430 to be written into a pending illegal instruction register 440. For example, decoder circuit 113 may receive the exception condition state signal discussed above from aligner circuit 112, along with signal(s) indicating whether the uncompressed instruction was derived from a compressed instruction. If the uncompressed instruction is illegal and was converted from a compressed instruction, then the contents of illegal instruction register 430 represent the relevant instruction information for the illegal instruction exception to be generated. If the uncompressed instruction is illegal but was not converted, then the uncompressed instruction itself represents the relevant information for the exception. In embodiments that implement the RISC-V ISA, pending illegal instruction register 440 may ultimately be written into the RISC-V MTVAL control/status register (CSR), as is defined behavior for an illegal instruction exception.

In some embodiments, decoder circuit 113 may implement a similar lockout mechanism for pending illegal instruction register 440 as described above with respect to illegal instruction register 430. For example, the lockout mechanism may permit only the first detected illegal instruction to be written to pending illegal instruction register 440, and may prevent this register from being overwritten until the lockout is cleared by a flush, as discussed above.

It is noted that while FIG. 4 illustrates one possible partitioning of circuitry among fetch circuit 111, aligner circuit 112, and decoder circuit 113, other organizations are possible. For example, some or all of the instruction conversion may occur within fetch circuit 111 rather than aligner circuit 112. Moreover, the selection between the saved compressed instruction and the uncompressed instruction that is shown within decoder circuit 113 may instead be incorporated within the logic that initially detects illegal instructions. For example, this functionality could be incorporated within aligner circuit 112 or elsewhere. As a result, it may be possible to eliminate pending illegal instruction register 440 and instead store the appropriate information, adjusted for original instruction size, in illegal instruction register 430.

FIG. 5 is a flow diagram illustrating an embodiment of a method of handling illegal instructions by a processor for an instruction stream having instructions of varying formats. Operation begins in block 500 where the processor fetches an instruction stream having instructions of varying formats. At block 502, the processor converts the instructions so that post-conversion instructions have a single format. For example, processor 100 may convert compressed RISC-V instructions to uncompressed form as discussed above. While differing instruction formats may include differing instruction sizes, they may also include instructions of the same size having formats that differ in other ways.

At block 504, during the converting, the processor detects that a given one of the instructions has an illegal format. For example, processor 100 may detect that the given instruction has an illegal opcode, one or more improperly formatted fields, or otherwise does not conform to the requirements of the ISA. Detection of an illegal format, in various embodiments, may be based on either the pre-conversion or post-conversion format of the given instruction.

At block 506, based on the detecting, the processor stores the given instruction in its pre-conversion format. For example, a copy of a compressed instruction in its original, pre-conversion format may be stored in illegal instruction register 430 as discussed above. In some embodiments, at least an opcode field of the given instruction may be stored, although other fields and/or the full instruction may also be stored.

At block 508, the processor executes the given instruction in its post-conversion format. For example, as discussed above, aligner circuit 112 presents uncompressed, post-conversion instructions so that the remainder of the pipeline only needs to support a single instruction format.

At block 510, the processor generates an illegal instruction exception based on the given instruction in its pre-conversion format. For example, as discussed above, although a compressed RISC-V instruction may be executed in uncompressed form, if the compressed instruction raises an exception (such as an illegal instruction exception), the exception should be generated using the original, compressed form of the instruction.

As noted above with respect to FIG. 3, in some embodiments, processor 100 may be deployed within a system 300. In particular, in some embodiments, processor 100 as described above with respect to FIGS. 4-5 may be deployed within a storage device. For example, a storage device may include a mass storage medium that may include magnetic and/or nonvolatile memory media, as well as a controller that includes processor 100. The controller may coordinate the various operations of the storage device, such as reading and writing data to the mass storage medium, implementing error detection/correction, supporting various device interface protocols, and/or any other suitable operations.

In the foregoing discussion, it has been assumed for sake of simplicity that processor 100 is a single-threaded processor. However, it is noted that the techniques discussed herein may readily be extended to processors that implement multithreading. That is, processor 100 may be configured to fetch instructions associated with multiple different threads, where a given illegal instruction is associated with a particular thread.

For example, some embodiments of processor 100 may support illegal instruction exception generation on a per-thread basis, such that different threads are capable of independently generating illegal instruction exceptions based on the pre-conversion (e.g., compressed format) instruction. Some embodiments of processor 100 may implement this approach by, for example, replicating the relevant circuitry (e.g., instruction conversion circuit 410, illegal instruction detection circuit 420, illegal instruction register 430) on a per-thread basis. In other cases, embodiments of processor 100 that support multithreading may support illegal instruction exception generation for fewer than all threads. For example, an embodiment may support only a single outstanding illegal instruction at a time within processor 100, regardless of which thread the illegal instruction is associated with; if an illegal instruction is detected in one thread, other threads could be stalled unconditionally or conditionally based on whether they also contain illegal instructions, depending on the implementation. In some such embodiments, limiting the number of outstanding illegal instructions in this manner may reduce or eliminate the degree to which the associated circuitry would need to be replicated.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure. Although various advantages of this disclosure have been described, any particular embodiment may incorporate some, all, or even none of such advantages.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims, and features from respective independent claims may be combined in any appropriate manner and not merely in the specific combinations enumerated in the appended claims.

What is claimed is:

1. A processor, comprising:
an instruction fetch circuit configured to fetch instructions defined according to an instruction set architecture (ISA), wherein:
the ISA includes a set of uncompressed instructions and a set of compressed instructions;
members of the set of compressed instructions have corresponding members in the set of uncompressed instructions; and
members of the set of compressed instructions are encoded in fewer bits than their corresponding members in the set of uncompressed instructions;
an instruction conversion circuit configured to, upon detecting a given one of the set of compressed instructions, cause a copy of the given compressed instruction to be saved and convert the given compressed instruction to a corresponding given uncompressed instruction for downstream processing; and
an illegal instruction detection circuit configured to:
detect that the given uncompressed instruction is illegal;
detect that the given uncompressed instruction was converted from the given compressed instruction; and
based at least in part on detection that the given uncompressed instruction is illegal and was converted from the given compressed instruction:
cause an illegal instruction exception to be generated; and
include an indication that the given compressed instruction is associated with the illegal instruction exception.

2. The processor of claim 1, wherein the illegal instruction detection circuit is further configured to:
detect that a second uncompressed instruction is illegal;
detect that the second uncompressed instruction was not converted from a compressed instruction; and
based at least in part on detection that the second uncompressed instruction is illegal and was not converted from a compressed instruction:
cause a different illegal instruction exception to be generated; and
include a different indication that the second uncompressed instruction is associated with the different illegal instruction exception.

3. The processor of claim 1, wherein to cause the illegal instruction exception to be generated, the illegal instruction detection circuit is further configured to assert an exception condition, wherein the exception condition causes the illegal instruction exception to be generated based at least in part upon the given uncompressed instruction reaching a commit pipeline stage without being flushed.

4. The processor of claim 1, wherein the ISA is a version of the RISC-V ISA.

5. The processor of claim 4, wherein to cause the illegal instruction exception to be generated, the illegal instruction detection circuit is further configured to cause either the given uncompressed instruction or the given compressed instruction to be written to an MTVAL register of the version of the RISC-V ISA.

6. A processor, comprising:
an instruction fetch circuit configured to fetch instructions defined according to an instruction set architecture (ISA), wherein:
the ISA includes a set of uncompressed instructions and a set of compressed instructions;
members of the set of compressed instructions have corresponding members in the set of uncompressed instructions; and
members of the set of compressed instructions are encoded in fewer bits than their corresponding members in the set of uncompressed instructions;
an instruction conversion circuit configured to, upon detecting a given one of the set of compressed instructions, cause a copy of the given compressed instruction to be saved and convert the given compressed instruction to a corresponding given uncompressed instruction for downstream processing; and
an illegal instruction detection circuit configured to:
detect that the given uncompressed instruction is illegal;
detect that the given uncompressed instruction was converted from the given compressed instruction; and
based at least in part on detection that the given uncompressed instruction is illegal and was converted from the given compressed instruction, cause an illegal instruction exception to be generated using the copy of the given compressed instruction;
wherein to cause the copy of the given compressed instruction to be saved, the instruction conversion circuit is further configured to write the copy of the given compressed instruction into an illegal instruction register based at least in part on detection that the given uncompressed instruction is illegal.

7. The processor of claim 6, further comprising a decoder circuit configured to:
receive the given uncompressed instruction and contents of the illegal instruction register; and
based at least in part on detection that the given uncompressed instruction is illegal and an original size of the given uncompressed instruction, select one of the given uncompressed instruction or the contents of the illegal instruction register to be written into a pending illegal instruction register.

8. A processor, comprising:
an instruction fetch circuit configured to fetch instructions defined according to an instruction set architecture (ISA), wherein:
the ISA includes a set of uncompressed instructions and a set of compressed instructions;
members of the set of compressed instructions have corresponding members in the set of uncompressed instructions; and
members of the set of compressed instructions are encoded in fewer bits than their corresponding members in the set of uncompressed instructions;
an instruction conversion circuit configured, upon detecting a given one of the set of compressed instructions, to:
cause a copy of the given compressed instruction to be saved by saving an opcode field of the given compressed instruction without saving a remainder of the given compressed instruction; and
convert the given compressed instruction to a corresponding given uncompressed instruction for downstream processing; and
an illegal instruction detection circuit configured to:
detect that the given uncompressed instruction is illegal;
detect that the given uncompressed instruction was converted from the given compressed instruction; and
based at least in part on detection that the given uncompressed instruction is illegal and was converted from the given compressed instruction, cause an illegal instruction exception to be generated using the copy of the given compressed instruction.

9. A device, comprising:
a mass storage medium; and
a controller comprising a processor that is configured to execute instructions defined according to an instruction set architecture (ISA), wherein the ISA includes a set of uncompressed instructions and a set of compressed instructions, wherein members of the set of compressed instructions have corresponding members in the set of uncompressed instructions; and wherein members of the set of compressed instructions are encoded in fewer bits than their corresponding members in the set of uncompressed instructions;
wherein subsequent to fetching a given one of the set of compressed instructions, the processor is configured to cause a copy of the given compressed instruction to be saved and convert the given compressed instruction to a corresponding given uncompressed instruction for downstream processing;
wherein the processor is further configured to:
detect that the given uncompressed instruction is illegal;
detect that the given uncompressed instruction was converted from the given compressed instruction; and
based at least in part on detection that the given uncompressed instruction is illegal and was converted from the given compressed instruction:
cause an illegal instruction exception to be generated; and
include an indication that the given compressed instruction is associated with the illegal instruction exception.

10. The device of claim 9, wherein the mass storage medium comprises a magnetic medium.

11. The device of claim 9, wherein the mass storage medium comprises a nonvolatile memory medium.

12. The device of claim 9, wherein the processor is further configured to:
detect that a second uncompressed instruction is illegal;
detect that the second uncompressed instruction was not converted from a compressed instruction; and
based at least in part on detection that the second uncompressed instruction is illegal and was not converted from a compressed instruction:
cause a different illegal instruction exception to be generated; and
include a different indication that the second uncompressed instruction is associated with the different illegal instruction exception.

13. The device of claim 9, wherein the ISA is a version of the RISC-V ISA.

14. The device of claim 9, wherein to save the copy of the given compressed instruction, the processor is further configured to save an opcode field of the given compressed instruction without saving a remainder of the given compressed instruction.

15. A device, comprising:
a mass storage medium; and
a controller comprising a processor that is configured to execute instructions defined according to a version of the RISC-V instruction set architecture (ISA), wherein the RISC-V ISA includes a set of uncompressed instructions and a set of compressed instructions, wherein members of the set of compressed instructions have corresponding members in the set of uncompressed instructions; and wherein members of the set of compressed instructions are encoded in fewer bits than their corresponding members in the set of uncompressed instructions;
wherein subsequent to fetching a given one of the set of compressed instructions, the processor is configured to cause a copy of the given compressed instruction to be saved and convert the given compressed instruction to a corresponding given uncompressed instruction for downstream processing;
wherein the processor is further configured to:
detect that the given uncompressed instruction is illegal;
detect that the given uncompressed instruction was converted from the given compressed instruction; and
based at least in part on detection that the given uncompressed instruction is illegal and was converted from the given compressed instruction, cause, using the copy of the given compressed instruction, an illegal instruction exception to be generated by causing either the given uncompressed instruction or the given compressed instruction to be written to an MTVAL register of the version of the RISC-V ISA.

16. A method, comprising:
fetching, by a processor, an instruction stream including instructions of varying executable formats defined according to a particular instruction set architecture that is supported by the processor;

converting, by the processor, the instructions so that post-conversion instructions have a single executable format of the varying executable formats;

during the converting, detecting, by the processor, that a given one of the instructions has an illegal format;

based on the detecting, storing, by the processor, the given instruction in its pre-conversion executable format;

executing, by the processor, the given instruction in its post-conversion executable format;

generating, by the processor, an illegal instruction exception; and including an indication that the given instruction in its pre-conversion executable format is associated with the illegal instruction exception.

17. The method of claim 16, wherein detecting that the given instruction has an illegal format comprises detecting the illegal format based on the pre-conversion executable format of the given instruction.

18. The method of claim 16, wherein detecting that the given instruction has an illegal format comprises detecting the illegal format based on the post-conversion executable format of the given instruction.

19. The method of claim 16, wherein the instruction stream includes instructions defined according to a version of the RISC-V ISA.

20. The method of claim 16, wherein the instruction stream includes instructions corresponding to a plurality of threads, and wherein the given instruction is associated with a particular one of the plurality of threads.

* * * * *